A. REPPER.
HARDNESS TESTING APPARATUS.
APPLICATION FILED NOV. 29, 1920.

1,430,261.

Patented Sept. 26, 1922.

Inventor
A. Repper.
By H. R. Kerslake
Atty.

Patented Sept. 26, 1922.

1,430,261

UNITED STATES PATENT OFFICE.

ALOIS REPPER, OF KLADNO, CZECHO-SLOVAKIA.

HARDNESS-TESTING APPARATUS.

Application filed November 29, 1920. Serial No. 427,163.

*To all whom it may concern:*

Be it known that I, ALOIS REPPER, citizen of Czecho-Slovakia, residing at Kladno, Aujezd 39, have invented new and useful Improvements in Hardness-Testing Apparatus, of which the following is a specification.

This invention relates to hardness testing apparatus of the kind in which the test piece and a standard piece are simultaneously forced into contact with a hardened steel ball, the relative hardness of the test piece as compared with the standard being determined by the relative dimensions of the impressions formed in both pieces by the hardened steel ball.

The object of the present invention is to devise an improved form of hardness testing apparatus of the above character, the useful life of which without renewal of the standard will be considerably prolonged as compared with known apparatus, and the invention consists in hardness testing apparatus of the type referred to comprising a hardened steel ball, a striker for forcing the same into contact with the material under test and a standard member movably interposed between the ball and the striker.

The invention also consists in a hardness testing apparatus of the above character in which the holder for the steel ball is of a resilient character to permit of removal or insertion of a ball as required.

The invention also consists in other details and arrangements hereinafter described or indicated.

The accompanying drawings illustrate one convenient form of hardness testing gauge in accordance with the invention.

Figure 1:
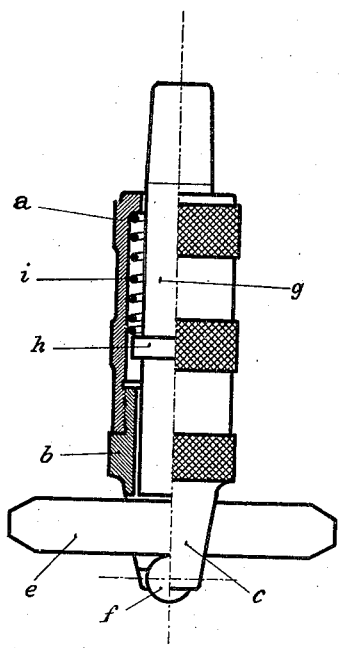
Figure 2:
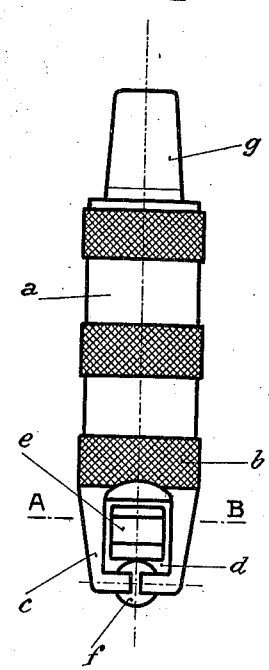
Figure 3:
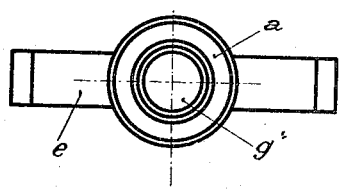
Figure 4:
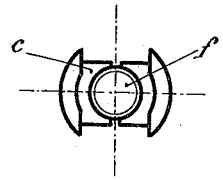

Figure 1 is part sectional elevation
Figure 2 is a side elevation
Figure 3 is a plan and
Figure 4 is a section on the line A—B of Figure 2.

In carrying the invention into effect in one convenient manner there is provided a sleeve or holder $a$ into which is screwed or otherwise secured a socket or like member $b$ having resilient jaws or extensions $c$ between which is rotatably held the hardened steel ball $f$.

Above the ball and between the jaws or extensions is a space $d$ into which is movably inserted a standard piece $e$ which conveniently takes the form of a rectangular or other bar of uniform strength and hardness, the bar being bevelled at its ends in order to facilitate its insertion into the said space.

Within the sleeve or holder $a$ is a striker $g$ having an annular shoulder or projection $h$ between which and the flange end of the holder is arranged a coiled spring or the like $i$, outward movement of the striker $g$ when the bar $e$ is removed being limited by the shoulder $h$ striking against the head $b$.

In order to determine the hardness of a test piece the hardness gauge with the standard $e$ inserted therein is placed upon the material to be tested and the striker $g$ struck with a hammer so that the hardened steel ball $f$ is forced into contact both with the standard and with the material to be tested and the relative hardness determined from the relative dimensions of the impressions so made.

It will be obvious that all four sides of the bar $e$ can be employed for receiving the impressions of the ball and each side may be employed for the whole of its length so that a very large number of measurements may be made before it is necessary to replace the bar by a new standard.

Moreover the hardened steel ball will also hold good for a large number of measurements but when it is necessary to replace the ball the gauge is struck upon a hard foundation whereupon the resilient arms $c$ are caused to yield and the ball is removed from the apparatus. A fresh ball is inserted by placing it into the recess formed in the resilient arms and then forcing it into position by the insertion of the standard bar, the bevelled end of which acts as a wedge to impart the necessary movement to the ball.

It is to be understood that the invention is not to be limited to the details of construction which are hereinbefore given by way of example as clearly many variations from the constructional form may be made without departing from the spirit of the invention.

What I claim is:—

1. In an apparatus for testing hardness, a standard member, a holder, a ball engaging the standard member, a striker mounted in said holder and engaging the standard member, and resilient means releasably retaining the ball in operative position with respect to the standard member.

2. In an apparatus for testing hardness, a holder, a striker mounted in said holder, a ball, resilient arms carried by said holder releasably retaining said ball, and a standard member interposed between said striker and said ball.

3. In an apparatus for testing hardness, a holder, a striker movably mounted in said holder, a socket member carried by said holder constituting a stop for said striker, a releasable ball carried by the socket, and a standard member interposed between the striker and ball.

4. In an apparatus for testing hardness, a holder, a striker movably mounted in the holder, a releasable ball, a socket member carried by the holder removably retaining said ball, a standard member interposed between the striker and the ball, and a stop member carried by the striker engageable with the socket for limiting the movement of the striker in one direction.

5. In an apparatus for testing hardness, a holder, a striker movably mounted therein, a ball carried by the holder, a standard member introduced between the ball and striker, means normally tending to move the striker toward the standard member, and means for limiting the movement of the striker and preventing engagement of the latter with the ball.

In testimony whereof I have signed my name to this specification in the presence of two subscribing witnesses.

ALOIS REPPER.

Witnesses:
 ING. K. KUTHAN,
 RUDOLF SUCHOPAREK.